E. F. VALLENTIN.
Vessels for Preserving Effervescent Liquids.

No. 146,964. Patented Jan. 27, 1874.

Witnesses.
E. F. Kastenhuber
Chas. Wahlers

Inventor.
Emil Fr. Vallentin
pr
Van Santvoord & Hauff
atty

UNITED STATES PATENT OFFICE.

EMIL F. VALLENTIN, OF NEWARK, NEW JERSEY.

IMPROVEMENT IN VESSELS FOR PRESERVING EFFERVESCENT LIQUIDS.

Specification forming part of Letters Patent No. 146,964, dated January 27, 1874; application filed March 28, 1873.

*To all whom it may concern:*

Be it known that I, EMIL FR. VALLENTIN, of Newark, in the county of Essex and State of New Jersey, have invented a new and useful Improvement in Vessels for Preserving Effervescent Liquids; and I do hereby declare the following to be a full, clear, and exact description thereof, which will enable those skilled in the art to make and use the same, reference being had to the accompanying drawing forming a part of this specification, in which drawing—

Figure 1:
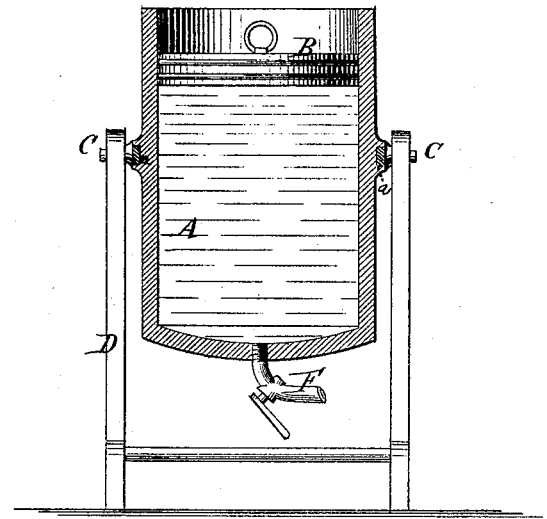
Figure 2:
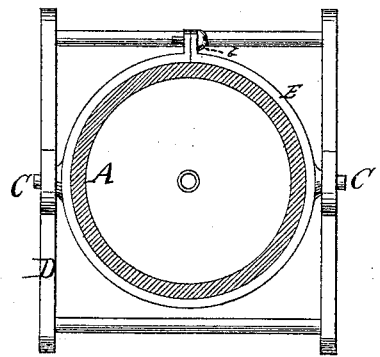

Figure 1 represents a vertical central section of my invention. Fig. 2 is a horizontal section of the same.

Similar letters indicate corresponding parts.

This invention consists in a vessel, made of glass or other vitreous material, in the form of a cylinder, which is hung upon trunnions, so that the same can be conveniently charged, and provided with a follower, which fits the side of the vessel closely, and the weight of which is such that it sinks down upon the surface of the liquid contained in said vessel, and follows said surface as the liquid diminishes, in such a manner that the carbonic-acid or other gas contained in the liquid is effectually prevented from escaping, while the liquid is protected against contact with the atmospheric air, and consequently enabled to preserve its effervescence to the last drop, the vessel being charged with liquid through the faucet by drawing outwardly the follower, as hereinafter stated.

In the drawing, the letter A designates a vessel, which is made of glass or other vitreous material, in the form of a cylinder, into the interior of which is fitted a plunger or follower, B, which is provided with suitable packing, so that it fits the sides of the cylinder, preventing any escape of gas or liquid from the interior of the vessel and shutting off the external air. Said follower is made of such a weight that if the same is inserted into the vessel A, and allowed to follow its inherent gravity, it will gradually descend until it strikes the bottom of the vessel. If the vessel is filled with beer or other effervescent liquid therefore, the follower, when introduced, will sink down until it strikes the surface of the liquid, and whenever some of the liquid is drawn out the follower will sink down again, so that it continually rests upon the surface of the liquid. By these means the gas contained in the liquid is prevented from escaping, and the effervescence of the liquid is preserved to the last drop. My vessel is provided with a faucet, F, in its bottom or side, and it is hung in trunnions C, which have their bearings in a suitable frame, D, so that when the vessel has been emptied it can be brought in a horizontal position for the purpose of drawing out the follower and recharging the vessel. The charge is, by preference, introduced through the faucet F, the follower being never removed from the vessel, so that the access of atmospheric air to the interior of said vessel is prevented as much as practicable. The vessel A is made of a vitreous material, and during its formation a circumferential groove or recess, *a*, is formed, into which is fitted an encircling-band, E, capable of being compressed and embedded in said groove or recess by thumb or set-screws *b*, or equivalent. This band is provided with trunnions C, which have their bearings in the frame D, so that the vessel can be turned from a vertical to an inclined or horizontal position, when desired, for the purpose of cleansing or replacing with liquid.

The follower, as before stated, sinks down upon the surface of the liquid, and causes a rapid discharge of the same when the faucet is opened, and follows the surface of the liquid until all is forced from the vessel; and when it is desired to replenish the vessel a connection is made between the faucet and a liquid-reservoir and the follower drawn outwardly, which creates a vacuum in the vessel, and thus draws in the liquid from the reservoir and enables me to fill the entire space between the follower and the bottom of the vessel, by which means the accumulation of air between the follower and surface of the liquid is avoided, which would be present if the follower were inserted at the top after the vessel was charged.

The follower may also be so arranged that the same, instead of sinking down in the vessel by its own gravity, is depressed by suitable levers and weights; or by any other device capable of producing the desired result.

What I claim as new, and desire to secure by Letters Patent, is—

The vessel A, made of a vitreous material, and suspended upon trunnions C, in combination with the follower B, for forcing the liquid in and out of the vessel through the faucet F, in the manner and for the purpose substantially as described.

EMIL F. VALLENTIN.

Witnesses:
 W. HAUFF,
 E. F. KASTENHUBER.